United States Patent Office 3,575,964
Patented Apr. 20, 1971

3,575,964
PRODUCTION OF LACTAMS
Edwin George Edward Hawkins, Lower Kingswood, Surrey, England, assignor to BP Chemicals (U.K.) Limited, London, England
No Drawing. Filed Dec. 9, 1968, Ser. No. 782,407
Claims priority, application Great Britain, Dec. 15, 1967, 42,696/67, 57,228/67; Aug. 15, 1968, 38,973/68
Int. Cl. C07d 41/06
U.S. Cl. 260—239.3       7 Claims

ABSTRACT OF THE DISCLOSURE

In the catalytic cleavage 1,1'-peroxydicyclohexylamine, to give caprolactam the majority of the cycloalkanone co-product is continuously removed by distillation from the mixture undergoing cleavage.

---

The present invention relates to the production of lactams by the cleavage of compounds which may be termed peroxyamines. Peroxyamines and the processes for making them are described in Belgian Pat. 701,327. The production of lactams by cleavage of peroxyamines in the liquid phase in the presence of catalysts is disclosed in Belgian Pat. 704,214. The cleave of peroxyamines to give lactams in the presence of Group I or Group II metal salts in the presence of added solvents is disclosed in our co-pending British application 26,076/67, while the cleavage of a specific peroxyamine namely 1,1'-peroxydicyclohexylamine in the presence of a lithium halide in a caprolactam environment is disclosed in our co-pending British application 51,095/67.

In all these reactions in which peroxyamines are cleaved to give lactams a cycloalkanone is formed as a co-product.

We have now found that the method by which the cycloalkanone is recovered is of considerable importance.

Accordingly the present invention is a process for the production of lactams by catalytically cleaving compounds of formula,

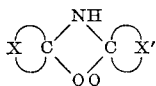

(I)

where X and X' are aliphatic divalent radicals which may be the same or different, in the liquid phase which comprises continuously removing the majority of the cycloalkanone co-product by distillation from the mixture undergoing cleavage.

The peroxyamines of Formula I which may be used in such processes are discused in Belgian Pat. 704,214. Thus Belgian Pat. 704,214 discloses that among compounds of Formula I which may be used are compounds in which the number of carbon atoms in each of the radicals X and X' which form part of the ring shown in Formula I may vary from 4 to 11 i.e. there may be from 5 to 12 carbon atoms in the ring. In particular 4 to 6 of the carbon atoms in each of X and X' may form part of the rings.

Examples of such compounds are those of formula

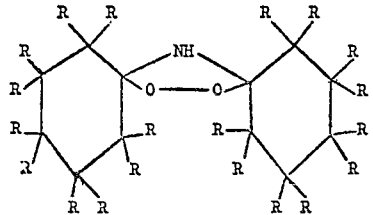

(II)

when each R is hydrogen or lower alkyl. A particularly important peroxyamine is 1,1'-peroxydicyclohexylamine which may be decomposed to caprolactam and cyclohexanone.

In the process of the present invention most of the cycloalkanone is recovered as the cleavage proceeds i.e. it is removed from the reaction zone in which the cleavage reaction takes place rather than from the final reaction product recovered from the reaction zone after reaction has terminated. The process of the present invention is of course to be distinguished from a process in which all the cycloalkanone remains in a refluxing solution and there is no removal of the cycloalkanone.

The requirement that the cycloalkanone should be recovered by distillation from the reaction mixture makes necessary the choice of a reaction system from which the cycloalkanone may be distilled off without removing irrecoverably any of the essential constituents of the reaction mixture. Thus where the reaction is carried out using for example an added solvent, which solvent boils at the same or lower temperature than the cycloalkanone it will not be practicable to distill off the cycloalkanone continuously from the reaction mixture unless it is possible to separate the solvent from the cycloalkanone afterwards, e.g. by distillation, and then to return the solvent to the reaction mixture.

The process of the present invention may be applied to the cleavage of compounds of Formula I by heating a solution of the compound in a non-hydrocarbon organic solvent containing a salt of an element of Group I or II. As indicated above it would not be desirable to use low boiling solvents and examples of suitable solvents are those with boiling points higher than that of the cycloalkanone. It may be advantageous not to use an added solvent but to carry out the reaction in the lactam product. Thus for example, in the case of 1,1'-peroxydicyclohexylamine the reaction may be carried out in molten caprolactam. The salts may be salts of metals of Groups I–A and II–A of the Periodic Table of the elements (as shown on page 30 of "Advanced Inorganic Chemistry" by Cotton and Wilkinson (1962)). Thus lithium, sodium, potassium or magnesium salts or salts of the alkaline earth metals, e.g. calcium, barium and strontium may be used. These salts may be halides or thiocyanates. Preferably the salt is lithium chloride or bromide.

As indicated above the cleavage reaction may be carried out by heating peroxyamine (I) with a lithium halide, e.g. lithium chloride or bromide in a reaction medium consisting of the molten lactam products. This avoids the need to add a solvent to the reaction mixture and thus simplifies product recovery. Thus as described in British patent application 51,095/67 cognate, the 1,1'-peroxydicyclohexylamine may be catalytically cleaved by lithium halide, in particular lithium bromide and lithium chloride, in a caprolactam environment.

The continuous removal of cycloalkanone may be applied to the batch cleavage of compounds of Formula I but it is most advantageously applied to continuous cleavage reactions. The cleavage reaction may be carried out in any convenient reaction system from which cycloalkanone may be distilled continuously from the reaction mixture. Thus a stirred tank reactor or plurality of tank reactors connected in series may be used with means for distilling off the cycloalkanone provided for each reactor. Alternatively the reaction may be carried out batchwise by introducing the peroxyamine into a reactor and then distilling off cycloalkanone continuously from the reactor. The distillation of cycloalkanone is preferably continued until substantially al the peroxyamine fed has reacted. The lactam may be then recovered. The temperature and pressure of the reactors should be such that cycloalkanone will distill off from the reaction mixture at a temperature at which the cleavage reaction proceeds at a satisfactory rate. It is found that when thermally decomposing 1,1'-peroxydi-cyclohexylamine to caprolactam, with cyclohexanone as the cyclo-alkanone co-product with lithium halides satisfactory rates of reaction and distillation are obtained by operating at pressures in the range 200 to 1 mm. Hg pressure, corresponding to reaction temperatures in the range 150 to 90 degrees C., for example pressures of 10 to 30 mm. Hg at reaction temperatures in the range 100 to 130 degrees C.

The lactam formed may be recovered in any convenient manner. Thus where no added solvents are used or where such solvents have higher boiling points than the lactam product, the lactam may be distilled from the reaction product. If a catalyst is to be recycled in solution in the reaction products to the reaction zone, it may be convenient to distil off only part of the lactam in the reaction product, retaining sufficient lactam to keep the catalyst in solution. Alternatively the reaction product may be added to water, and the resulting aqueous solution extracted with a solvent for the lactam, e.g. chloroform. The solvent for the caprolactam may then be distilled off from the extract and the lactam recovered. Direct distillation of lactam from the reactam mixture is preferable where possible however.

EXAMPLE 1

An oil containing 1,1'-peroxydicyclohexylamine (1.44 mole; cyclohexanone, 0.15 mole) was fed over 1.2 hours to a stirred glass reactor, at 15 mm. mercury pressure, which initially contained caprolactam (0.68 mole) and lithium chloride (1.10 mole). Cyclohexanone was removed continuously as a distillate and internal cooling was applied to remove the heat of reaction and maintain the reaction temperature at 100–107° C.

After a further 0.8 hour the peroxide concentration in the reactor had fallen to a very low level. The product was dissolved in water, the aqueous solution filtered then extracted with chloroform. Distillation of the chloroform extract gave crude caprolactam, which was analysed by gas phase chromatography and also by distillation followed by hydrolysis of the lactam to aminocaproic acid, which was potentiometrically titrated. The cyclohexanone distillate was analysed by gas phase chromatography and also by titration using the hydroylamine hydrochloride method.

The yields (moles product per 100 moles peroxyamine fed) were: caprolactam, 88, cyclohexanone, 92.

Of the chloride fed 1.0% was converted to chlorocaproamide, 0.16% to other volatile products and 0.15% to chlorinated high boiling compounds.

EXAMPLE 2

An experiment was carried out as in Example 1 using caprolactam, 0.46 mole); lithium chloride, (0.50 mole); 1,1'-peroxydicyclohexylamine, (1.44 moles); and cyclohexanone, (0.11 mole) at 102–108° and 15 mm. Hg. The 1,1'-peroxydicyclohexylamine was fed over 1.5 hours and the total reaction time was 2.6 hours. The yields, calculated as in Example 1, were: caprolactam, 88%; cyclohexanone, 90%.

EXAMPLE 3

A cycle of three experiments was performed in which 1,1'-peroxydicyclohexylamine (3×1.43 moles) and cyclohexanone (3×0.10 moles) were added to the reactor, which initially contained caprolactam )0.46 mole) lithium chloride (0.5 mole), over 2, 3, and 2 hours respectively at 105–110° and 15 mm. Hg. After each peroxyamine addition the cyclohexanone distillation was continued (for 1.2, 1.0, 1.25 hours respectively) then crude caprolactam (79 g.; 175 g.; 170 g. respectively) was distilled at 0.1 mm. Hg, base temperature 135–140°. In the first two experiments the residue containing lithium chloride was reacted with the fresh charge of peroxyamine.

In the third experiment the residue after caprolactam distillation was dissolved in water, insoluble compounds were filtered off and the aqueous solution was extracted with chloroform which was subsequently distilled.

The overall yields calculated as in Example 1 were: caprolactam, 80.5%; cyclohexanone, 96.5%.

EXAMPLE 4

Separate feeds of lithium chloride dissolved in caprolactam and an oil consisting mainly of 1,1'-peroxydicyclohexamine and some cyclohexanone were fed to a pair of stirred glass reactors of 280 ml. capacity operated continuously in series.

Provision was made for the removal of cyclohexanone as a distillate from both reactors at 15 mm. Hg pressure. Using molar feed ratio LiCl:1,1'-peroxydicyclohexylamine:caprolactam:cyclohexanone of 1:1:2:0.15 and contact time of 1.0 hour at 106° in the first reactor and 1.0 hour at 108° in the second the peroxide conversion was complete; 99.4% was converted in the first reactor and 0.6% in the second reactor. The yields were calculated as in Example 1: caprolactam, 82%; cyclohexanone, 101%; caproamide and hex-5-enamide, 2.9%; 6-chlorocaproamide, 0.7%; cyclohexenylcyclohexanone 1.5% high boiling material (4% w./w.) was also produced.

EXAMPLE 5

A continuous experiment with concurrent cyclohexanone removal at 125° and 15 mm. Hg using a feed molar ratio of lithium chloride; caprolactam:1,1'-peroxydicyclohexylamine:cyclohexanone of 1:2:1:0.15, and contact times of 0.4+0.4 hours gave molar yields of caprolactam, 83.4; cyclohexanone, 97.1; caproamide+hex-5-enamide, 5.0; 6-chlorocaproamide, 0.6; cyclohexenylcyclohexanone, 0.8% and high boilers, 5.4% w./w. at 99.7% conversion of 1,1'-peroxydicyclohexylamine.

EXAMPLE A

This is a comparative example, not according to the inventon. An experiment was carried out under the conditions of Example 1 except that the product cyclohexanone was refluxed but not removed from the reactor. The caprolactam and cyclohexanone molar yields fell to 75 and 85% respectively. A comparison of this example with Example 1 clearly shows the much greater yields of caprolactam and cyclohexanone obtained when the cyclohexanone is removed continuously by distillation during the reaction.

EXAMPLE B

This is a comparative example not according to the invention.

Separate feeds of lithium chloride dissolved in molten caprolactam and an oil containing mostly 1,1'-peroxydicyclohexylamine and some cyclohexanone were fed to a 280 ml. stirred reactor at 106° 100 mm. Hg. The feed molar ratio lithium chloride: caprolactam: peroxyamine: cyclohexanone was 1.2:1:0.15. From the first reactor the reaction products overflowed through a plug-flow reactor of 80 ml. capacity. Cyclohexanone was not removed as a distillate from either reactor and the contact times were 3.0 and 1.0 hours respectively giving peroxide conversions of 94.8 and 3.8 in the first and second reactors (total 98.6%).

The yields calculated as in Example 1 were caprolactam, 82%; cyclohexanone, 80%; caproamide+hex-5-enamide, 5.5; 6-chlorocaproamide, 0.7; cyclohexenylcyclohexanone, 5%. The yield of high boiling material was 5.5% w./w.

A comparison with Example 4 clearly shows the much greater yield of cyclohexanone obtained when concurrent distillation of cyclohexanone is employed.

EXAMPLE C

This is a comparative example not according to the invention.

Using the same molar feed ratio as in Example 5 without concurrent cyclohexanone removal an experiment at 125° with 100% 1,1'-peroxydicyclohexylamine conversion, gave yields of caprolactam, 73; cyclohexanone, 68; caproamide+hexenamide, 7; 6-chlorocaproamide, 2-cyclohexenylcyclohexanone, 14% and higher boilers, 11% w./w.

Comparison with Example 5 shows that leaving the cyclohexanone in the reaction medium led to lower caprolactam and cyclohexanone yields and much higher yields of by-products.

I claim:
1. A process for the production of lactams which comprises heating a compound of the formula,

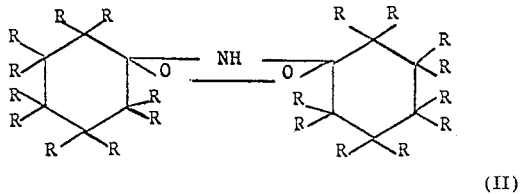

(II)

wherein R is hydrogen or lower alkyl, to a temperature in the range of 90° C. to 150° C. in the presence of a chloride or bromide salt of lithium, sodium, potassium, magnesium, calcium, barium or strontium in the liquid phase and continuously removing the majority of the cycloalkanone co-product by distillation from the mixture as it undergoes cleavage.

2. A process according to claim 1 wherein the compound of Formula II is 1,1'-peroxydicyclohexylamine, and the cycloalkanone removed is cyclohexanone.

3. A process according to claim 1 wherein the salt is lithium chloride or lithium bromide.

4. A process according to claim 3 wherein the compound of Formula II is catalytically cleaved in a motlen caprolactam environment.

5. A process according to claim 2 wherein the 1,1'-peroxydicyclohexylamine is catalytically cleaved at a pressure in the range 1 mm. Hg to 200 mm. Hg.

6. A process according to claim 5 wherein the temperature is in the range 100° to 130° C. and the pressure is in the range 10 to 30 mm. Hg.

7. A process according to claim 2 wherein the compound of Formula II is catalytically cleaved in a stirred tank reactor or a plurality of stirred reactors in series.

References Cited

FOREIGN PATENTS 1,537,517   7/1968   France _____ 260—239.3

OTHER REFERENCES

Derwent's "Belgian Patents Reports," 12/68, abstracting Belgian Patent 704,214, granted Sept. 22, 1967.

HENRY R. JILES, Primary Examiner

R. T. BOND, Assistant Examiner

U.S. Cl. X.R.

260—294.7, 307, 561, 586